United States Patent Office 2,709,689
Patented May 31, 1955

2,709,689

EMULSION VAPOR BARRIER COATING COMPOSITIONS

Philip C. Herzog, Cleveland, and Allan E. Gilchrist, Fairview Village, Ohio, assignors to The Glidden Company, Cleveland, Ohio, a corporation of Ohio No Drawing. Application November 24, 1952, Serial No. 322,359

14 Claims. (Cl. 260—8)

This invention relates to emulsion coating compositions particularly adapted for use as substantially non-penetrating coatings upon which finish coats may be applied if desired. More particularly the invention is concerned with vapor-barrier coatings.

It has been recognized for many years that the condensation of water vapor within the outside walls of buildings and homes, especially those of frame construction, causes numerous difficulties. Such condensation is particularly encountered in the northern or higher latitudes where low winter temperatures occur. The water vapor is generated within the heated living or working space of the structure and penetrates the outside walls, there condensing to liquid at any surface whose temperature is below the then existing dew point. As such condensation continues, the water accumulates within the wall structure, rendering any insulation therein soggy and causing rapid rotting of the wall, framework and sills. The outer siding becomes water-soaked and the paint thereon blisters and peels. The consequences of such condensation can be mitigated by constructing the walls in such manner that free circulation of air can occur within the wall, but such construction prevents effective thermal insulation. In recent years various forms of vapor barriers have been proposed and applied, such barriers being placed on the inside or heated side of the studs or rafters. Metal foil, water-proof building paper, and barriered insulation blankets have been used, but all of these require careful installation to insure freedom of leaky joints around edges. Subsequent construction operations, such as the installation of lath or other interior wall finish, must be done carefully so that holes are not punched into the rather fragile barrier membranes. Such careful work is time-consuming and expensive, and even when done conscientiously seldom results in a completely vapor-tight job because the barrier material must usually be cut to fit around electrical outlets, hot air registers and other facilities which are installed within the stud or rafter space of the wall. The edges of such cut-out areas are seldom sealed off, thereby leaving vapor passageways through or around the membrane.

Vapor barrier paints or trowel-coatings have been applied in recent years on the surface of the finished wall, as on the exposed surface of wall board, insulation board, etc., but to the best of our knowledge, such paints or trowel-coatings have generally contained appreciable quantities of asphalt. They have not been particularly adapted for use on the walls of homes and other structures where decorative coatings are desired on the inside wall surfaces, since the asphalt of the barrier coatings tends to bleed through such decorative coatings. Moreover, the asphalt coatings generally remain soft and thermoplastic and are not well suited as a base for decorative coatings even if bleeding were no problem. A few drying-oil type vapor barrier coatings have been developed, but as far as we are aware, such barrier coatings must be applied in several coats to become effective vapor barriers, and hence become rather expensive as to the material and labor costs of applying them. Moreover, few of such drying-oil coatings are alkali-resistant, and deteriorate in the course of a few years, especially where applied to plaster, cement or other alkaline surfaces.

Based on investigations made by the U. S. Bureau of Standards, the Federal Housing Administration has adopted certain vapor transmission specifications as representing the maximum transmission rate which can be considered acceptable in a vapor barrier coating system. These specifications call for a transmission rate of less than 6 grams of water per square meter in 24 hours at 50% vs 5% relative humidity and 73° F. The method for conducting water-vapor transmission rates is described in Circular T448 of the Technical Association of the Pulp and Paper Industry. The test method there described is identical with the method described by the American Society for Testing Materials in their Tentative Test Designation D998–48R (1948).

We have now found that emulsion coatings formulated as hereinafter described can provide excellent non-penetrating properties by virtue of which even a single coat can provide a continuous coating meeting the FHA specifications for barrier coatings. Our coatings can be applied to any of the usual interior wall materials to provide a priming and sealing coat on which other decorative coatings can be applied, or which can alone serve as decorative coatings. Thus, our emulsion coatings can be applied on finished plaster walls, plaster-board or "dry" walls, fiber board and other structural, acoustic panels or board, brick, tile, asbestos-cement products, stucco cement, paper, paper board, or on any of the other conventional interior wall surfaces whether they be porous or dense in surface texture. Accordingly, our emulsion barrier coatings permit numerous economies in building construction since the usual construction practices can be carried on until the structure has been completed, after which the interior walls can be coated with a single coat of our emulsion barrier compositions to provide a continuous vapor barrier which at the same time seals the surface and affords an excellent finish, with or without subsequent decorative finishes. Moreover, the barrier films of this invention are alkali-resistant and hence are permanent.

Accordingly, it is an object of this invention to provide an emulsion-type relatively non-penetrating coating composition particularly adapted for use as a vapor barrier coating.

It is another object to provide an emulsion-type coating composition which can be applied to any of the conventional interior wall surfaces in even a single coat to form a continuous and permanent vapor barrier film.

It is yet another object to provide an emulsion-type vapor barrier coating composition which also functions as a base and sealing coat and which is characterized by good "hold-out," i. e., non-sinking or non-penetrating, qualities.

It is another object to provide an emulsion-type coating composition which can be applied to porous surfaces without penetrating but slightly, thereby avoiding the waste incident to penetration, and providing spreading economies, while ensuring the formation of a continuous film.

These and other objects will be apparent from the following description of the invention.

We have found that emulsion-type coatings which are formulated with vapor resistant non-asphaltic, film-forming materials in latex form with or without pigments and/or other "inert" material may be suitably modified as to viscosity characteristics to provide a coating which exhibits little penetration when applied to porous surfaces, and which forms an effective, adherent, and permanent vapor barrier on the surface of any of the conventional vapor-permeable interior construction materials. By excluding asphaltic and other comparably thermoplastic film-forming materials from such compositions, we provide a resulting film that is well suited for use as a base coat upon which decorative coatings, wallpaper, etc., may be applied.

Our compositions represent a combination of interrelated characteristics which mutually cooperate to produce a continuous film when applied even to coarse-textured, porous nappy surfaces. Of primary importance for the development of the desired continuous sealing film is the use of a water-immiscible, alkali-resistant, film-forming material of fine particle size in latex form, which material is capable of developing a continuous, substantially non-porous film when deposited from an oil-in-water-type latex emulsion. Of equal importance is the development in the film-forming emulsion of viscosity characteristics which enable the emulsion to stay on the surface of the material being coated so that the continuity which the film-former seeks to achieve can be obtained. The viscosity characteristics depend on the presence of certain emulsifiers, on the presence of alkali-soluble acid-precipitable protein, and on the solids of the latex film-forming material taken in conjunction with any pigment or other "inert" material which is present.

Flake pigment is especially useful in vapor-barrier coatings. Mica has been used heretofore in emulsion coatings, but to the best of our knowledge no one heretofore has recognized the merits of flaky pigment for vapor barrier coatings when combined with non-penetrating latex emulsions of vapor-resistant film-forming materials. By using pigment and especially flaky pigments, such as mica and aluminum flake in our coatings, strong, flexible, integral films are provided, and the vapor resistance of the film-forming material is reinforced by the vapor resistance of the flaky pigment. Moreover, the flaky structure cooperates with the viscosity characteristics to lessen the penetration or "sinking" of the coating when applied to coarse textured, porous surfaces and helps in laying and blocking fibers.

The water phase of our emulsion coatings also aids in laying the fibers or nap of spongy fibrous wall boards, acoustic tile and like materials, and in penetrating into them to seal them off thereby further reducing vapor penetration which might otherwise occur through the wick action of fibers which penetrate through the film. These effects of the emulsion and especially of pigmented substantially non-penetrating emulsions are in sharp contrast with solvent-thinned coatings which are not specific wetters for the fibers.

We have mentioned above that certain viscosity characteristics are important in a vapor barrier coating composition. The desired characteristics can be achieved readily in oil-in-water-type emulsion coatings, but we know of no practical method for imparting such characteristics to conventional solvent-thinned paints or water-in-oil-type emulsion coatings. The viscosity characteristic which we desire is that of a graphically asymptotic relationship between viscosity and rate of shear when plotted on rectangular coordinates having uniform scales. The region of greatest rate of change in viscosity should be below about 50 R. P. M. when the rate of shear is expressed in terms of revolutions per minute of a rotational viscometer element. The Brookfield viscometer is the type of device which we have in mind for use in measuring viscosities in terms of shear rates corresponding to rotational velocities of the order mentioned in this paragraph. We desire a composition whose viscosity changes little as the rate of shear is increased beyond that equivalent to about 50 R. P. M., but whose viscosity increases disproportionately as the rate of shear decreases from the equivalent of about 50 R. P. M. to low rates of shear such as those equivalent to 1, 2 or 4 R. P. M. Preferably the greatest rate of change of viscosities should occur below a shear rate corresponding to about 20 R. P. M. since the viscosities at this and lower shear rates are responsible in large measure for the development of good "hold-out" or non-penetrating characteristics when the composition is applied in the conventional ways (e. g., brushing, spraying, etc.).

Such a viscosity characteristic as described above can exist, of course, at various viscosity levels as measured at a rate of shear equivalent to say 50 R. P. M., but it will be understood that the viscosity at this or other rate of shear which simulates actual application conditions should not be so great that the coating composition becomes hard to apply by conventional methods, i. e., by brushing, spraying, etc. Preferably the viscosity as measured at a shear rate equivalent to 50 R. P. M. should not exceed the range which has commonly been used in the past for brush or spray coatings such as varnishes, enamels, lacquers, etc. (i. e., 15 to 120 seconds by the No. 4 Ford Cup method), and may conveniently and desirably be considerably lower, i. e., in the range of present-day water-thinned paints (about 15 to 80 seconds on the No. 4 Ford Cup). It should not be understood that the present invention concerns only thixotropic compositions, since such is not the case. Some of our compositions are fluid when at rest in the container, and all require but slight stirring to bring them to a suitable consistency for brushing or for application in other manners.

The Brookfield viscometer is a device in which the drag produced upon a spindle rotating at a definite constant speed while immersed in the liquid under test is indicated on a rotating dial by a pointer which is attached to the spindle shaft. The reading obtained represents the tension produced in a spiral spring the core of which is directly connected to the spindle shaft, while the outside terminal is connected to the dial. The dial, in turn, is directly connected to the constant speed motor shaft. Four spindles are provided to cover the range of zero to 100,000 centipoises. The machine is constructed so that various speeds are available quickly and so that different rates of shear are readily obtained with each spindle.

The increased viscosity at moderately low shear rates becomes significant when its influence on the behavior of the coating composition is considered. That is, when one of our emulsion coating compositions is being brushed onto a porous surface, it flows easily from the brush and gives easy working. But consider a capillary pore in the surface. The coating composition is forced or tends to flow into the pore as the brush passes over the mouth of the pore, but when the brush has passed beyond the mouth the high viscosity at low shear rate prevents the coating from penetrating deeper into the pore. The coating therefore remains static near the mouth of the pore, at substantially the depth to which it was forced by the brush. The composition then dries and sets at that depth. If a coating were applied which did not possess our described viscosity characteristics, it would tend to flow deeper into the pore under the influence of capillary-surface tension effects, and one would find after a few minutes that the coating had sunk below the surface. In order to cover the surface with such a coating it would be necessary to allow the first coat to dry and then to apply additional coats, each such additional coat filling up more and more of the pores until ultimately a true surface coat could be maintained.

The pigment and especially flaky pigment cooperates with the viscosity characteristic of our compositions to provide the good "hold-out" on porous surfaces, just described. In some instances the particles or flakes of pigment may entirely cover the mouths of certain pores. In other instances, one or more particular flakes may only partially cover the mouth of the pore. In the latter case, some of the composition may be forced by the brush into the pore, but again the viscosity characteristic keeps the coating from penetrating to greater depth. Quite different action would occur with coating compositions not exhibiting the desired viscosity characteristic, even though pigmented with flaky pigments, since capillary action and surface tension forces would cause the coating to pass on through the partially-covered pore mouth until it completely filled the pore. Thus, the pigment, even of the flaky type, would fail to prevent the coating from sinking into the pores, even though the latter were entirely covered or only partially covered with pigment particles or flakes.

For what has been said above, it will be understood that the described viscosity characteristic, aided or not with pigment or other "inert" material, is instrumental in promoting good "hold-out" on porous surfaces, thereby permitting a given quantity of the composition to be spread over a larger area than would be possible with a composition not possessing the described viscosity characteristic and "hold-out" properties. Furthermore, the "hold-out" or controlled penetration makes it possible for a single coat to form a continuous film over nappy and/or porous surfaces, and thereby to establish the desired continuous vapor barrier. The presence of pigment within suitable limits in such a composition further promotes both of these desired results while also adding its vapor resistance to that of the film-forming material and in the case of flake pigment imparting to the film the recognized film-strengthening effects of such pigment.

The desired viscosity characteristics can be obtained in oil-in-water emulsion coatings by incorporating certain classes of emulsifiers in combination with alkali-soluble acid-precipitable protein (e. g., casein, soya protein, peanut protein, etc.). Thickening agents such as the usual gums and starches should generally be avoided, as they are apt to unduly impair the water- and water-vapor-resistance of most films. However, small amounts can be used where the total content of water-sensitive materials is small. Soaps, proteinaceous materials and any other water-sensitive materials will impair the water-vapor barrier properties of the film if present in excess of prescribed amounts. Accordingly, it becomes essential that the emulsion be formulated so as to achieve the desired viscosity characteristics and useful surface tension values by using as small a quantity of water-sensitive materials as possible while yet producing a stable and serviceable emulsion of fine particle size and of good keeping qualities. Preservatives, buffers and modifiers, such as cutting agents, colloids (e. g., bentonites), antifoams, dispersing agents, etc., are apt to be water-sensitive and should be considered along with the other water-sensitive materials mentioned above in estimating the total content of water-sensitive materials.

Non-ionic and/or anionic surface active agents of widely variable composition can be used as emulsifiers in our coatings, these constituting the emulsifier component of the emulsifier-protein-"inert solids" combination which is necessary to the development of the desired viscosity characteristics. Soaps are probably more effective for this rheological purpose than are other surface active agents, but are not used much in excess of the requirements for good emulsification. The proteinaceous materials also promote emulsification and stabilization of the emulsion, but the amounts needed for this purpose are usually amply supplied by the quantities used rheologically to develop the viscosity characteristics. While pigments may constitute part of the rheological system, they are not usually water-sensitive so they may be employed advantageously within limits to supplement the rheological contributions of the emulsifiers and proteinaceous materials without significantly increasing the total content of water-sensitive materials. By suitably proportioning these classes of ingredients in accordance with principles explained more fully hereinafter, serviceable emulsions low in water-sensitive materials and yet of desired viscosity and surface tension characteristics can be achieved with the film-forming materials identified below.

A distinction should be recognized between the soaps made with volatile ammonia, amines, etc., and the soaps made with non-volatile alkali metal hydroxides. Excess ammonia and/or volatile amines of such soaps is dissipated from the film as it ages and hence is not a permanent active part of the final film and therefore does not permanently impair the water vapor resistance as does excess alkali in alkali metal soaps. Accordingly, the ammonium and/or amine soaps may be used in the emulsion to assist the non-volatile soaps in developing the desired viscosity characteristics, while impairing the finished film to a lesser extent than the non-volatile metallic soaps. We prefer to use the smallest amount of non-volatile soap which is consistent with the formation of a stable emulsion and stable pigment dispersion, and to augment these permanent soaps with sufficient ammonium and/or volatile amine soaps, and with proteinaceous colloids, to develop the desired viscosity characteristics. For similar reasons we prefer to use ammonia or volatile amines to "cut" or disperse the protein, since in this way the amount of active, permanent water-solubles in the film can be kept to a minimum. Non-ionic as well as anionic emulsifiers other than soaps, being permanent water-sensitive materials, are desirably kept to a minimum. They can seldom be excluded, however, since most coating latexes contain one or more of them.

The surface tension of an oil-in-water emulsion for use as a vapor barrier should ordinarily be kept above about 35 dynes per centimeter, and higher values may be employed to advantage when the composition is being particularly formulated for application to a specific material.

The film-forming materials used in our coating compositions must be of fine particle size (less than about ½ micron) and must be capable of forming a substantially continuous film when deposited from an oil-in-water emulsion, and should exhibit low rates of water-vapor transmission. It should be borne in mind that water-vapor resistance is different from water resistance. Numerous film-forming materials which exhibit good water resistance may yet be capable of transmitting water-vapor rather easily when laid down in a single coat. Several coats of such materials may constitute useful vapor barriers, but it will be understood that one of our main objects is to provide a good barrier in a single coat. Hence the film-forming material must be selected primarily on the basis of its vapor barrier properties, and secondarily on its water resistance properties, rather than vice versa. We have found numerous synthetic rubber and rubber-like plastics to be suitably vapor-resistant, alkali-resistant and water-immiscible for use as vapor barriers.

We contemplate the use of latexes of the following rubber-like film-formers:

Elastomeric polymers of vinyl compounds; e. g., butadiene, isoprene, chloroprene, vinyl chloride, vinyl acetate, acrylates, styrene, polyethylene elastomers, etc.;

Elastomeric polymers of isobutylene;

Copolymers containing at least one vinyl compound; e. g., butadiene-styrene, isoprene-isobutylene, vinyl chloride-vinyl acetate, butadiene-acrylonitrile, vinyl chloride-vinylidene chloride, methyl acrylate-ethyl methacrylate, acrylonitrile-isobutylene, drying-oil-modified copolymer elastomers, etc.;

Mixtures of latexes of the foregoing elastomeric materials. We particularly prefer the butadiene-styrene copolymers which are presently available commercially in latex form with the copolymers composed of about 57% to 75% styrene and 25% to 43% butadiene. Plasticized polystyrene film-formers are also eminently suitable, as are polyethylene elastomers, polymerized vinyl acetate elastomers, polymerized vinyl chloride elastomers and other synthetic rubber-like film-formers which are polymerized commercially in aqueous emulsions to form a synthetic latex. The emulsion-polymerized materials are preferred since apparently they can be brought to stability with smaller amounts of emulsifiers than can be used to achieve equal stability where the same materials are emulsified after being polymerized. The polymerized vinyl acetate films should be heated somewhat or aged under favorable conditions to perfect the continuity of the film. Preferably, vinyl acetate polymers are used for barrier coatings, which are applied to structural materials in factories equipped to heat the film. The film-formers which develop continuity at room temperatures are eminently suitable for packaged barrier compositions which are to be applied "on the job."

When pigmented compositions are prepared in accordance with the invention, the total volume of pigment preferably should not exceed about 1 volume per unit volume of film-former solids. When pigmented vapor barrier compositions are prepared, at least one-half of the total pigment volume should preferably be composed of flake pigment, and the total pigment should not exceed about 4 volumes thereof per 5 volumes of film-forming material. Non-flake pigment which is included should be alkali-resistant. When aluminum flake is to be included in the barrier film, it is best to add it to the emulsion at the time the composition is to be applied.

In summary of the foregoing, it will be understood that our invention provides a water-vapor barrier coating composition which exhibits the following features of merit:

1. It meets the requirements of FHA for water-vapor impedance when properly applied in a single coat.

2. The coating composition has its penetration controlled to give good "hold-out" on the usual vapor permeable structural surfaces, whereby a substantially continuous unbroken film can be formed.

3. It is easy to apply by any of the usual methods.

4. The single coat itself dries quickly and after suitable aging is durable, washable, permanent and attractive with or without special tinting.

5. The coating supplies an excellent base or sealer coat for other decorative coatings, and may be incorporated into multicoat systems with a corresponding improvement in water-vapor resistance.

6. Being an oil-in-water emulsion, it possesses the usual advantages of such type of coating, in that it can be thinned with water, can be washed from hands, brushes and spray equipment with soap and water, is practically free of solvent odor, and eliminates the fire and toxicity hazards of solvent-thinned coatings.

7. By exhibiting good "hold-out," it has a good spreading power, and by forming a good vapor barrier in a single coat, the material and labor costs per square foot of applied barrier film are kept to a minimum.

8. The film is alkali-resistant and hence is permanent even on plaster, cement and like alkaline surfaces.

In further summary and explanation, it will be understood that the invention is concerned technically with the preparation of emulsion coating compositions having desired viscosity characteristics, from three main classes of ingredients other than water. They are:

1. "Inert solids," which are finely-divided water-immiscible materials capable of being dispersed in water. These materials fall in three main categories:

(a) The resinous film-forming material of the composition, usually provided in the form of an emulsion-polymerized synthetic material in latex form; this material is classed as "inert solid" matter since it appears to behave rheologically no differently than pigmentary materials, so far as the development of the desired viscosity characteristic is concerned.

(b) Film-forming material—diluents, or modifiers present as distinct water-insoluble dispersed particles in the emulsion; for instance, varnish, wax or plasticizer emulsions added to the latex emulsion which function rheologically as "inert solids" until the emulsion is dehydrated.

(c) Pigmentary matter having a particle size below about 44 microns, including hiding pigments, fillers and/or extenders such as mica, asbestine, coating clays, etc. See Mattiello, "Protective and Decorative Coatings," vol. II (1942), pages 164–6 and 460. In clear coating compositions composed only of emulsifiers, protein, film-forming material and water the resinous film-forming solids constitute the whole of the "inert solids." In pigmented coatings containing none of the materials in the "b" category, the "inert solids" are composed of both the resinous solids and the pigmentary matter (i. e., the sum of the solids in the above "a" and "c" categories). In the case of coatings containing materials in the "a," "b" and "c" categories, all three types of material together constitute the "inert solids." In respect to the problem of developing the desired viscosity characteristics in a coating composition comprising such "inert solids," it appears that the volume of such "inert solids" is of fundamental significance. Accordingly, in some of the following calculations, equivalent "volumes" are computed by dividing the mass of each type of "inert solid" by its specific gravity. The specific gravity of the resinous film-forming solids in the following examples is assumed to be 1.0 for the purposes of such computations. In the case of pigments, fillers, etc., the actual specific gravities have been used.

2. Emulsifiers selected from the group consisting of non-ionic emulsifiers and monovalent anionic soaps of fatty acids having between about 12 and 20 carbon atoms. Mixtures of both types of emulsifiers can be used, but we prefer to eliminate the non-ionics as far as feasible for reasons already stated above. Soaps of any of the amines mentioned in the U. S. Patent No. 2,587,657 are suitable for this purpose. The specific gravity of all emulsifiers is assumed to be 1.0 for purposes of calculating their equivalent "volumes."

3. Proteinaceous emulsion stabilizers selected from the class known as alkali-soluble, acid-precipitable protein. Casein, soya protein, peanut protein, etc. are contemplated. The specific gravity of such proteins is assumed to be 1.0. In the following discussion under the heading "Proportions," all remarks, limits, etc. are based on the use of isolated soya protein as the alkali-soluble, acid-precipitable protein. Where other proteins of this class are used, the volume(s) thereof should be converted by appropriate factors to give their "soya protein equivalent volume(s)." For example, the volume of casein present in a formulation should be multiplied by a factor of about 1.4 to give its "soya protein equivalent volume." Such factors are necessary because of inherent differences in the viscosity effects of different proteins. Inasmuch as casein as presently marketed appears to be fairly uniform in its voscosity effects when dispersed in water, the above factor of 1.4 can here be stated. Other proteins, however, such as corn, wheat and peanut proteins, as presently available, vary so widely in viscosity properties that the appropriate factor must be determined on each batch of such protein which is to be used in this invention.

PROPORTIONS

We have discovered that in order to secure the desired asymptotic viscosity characteristics from the foregoing classes of materials when combined with water to form an emulsion of the oil-in-water type, the proportions must be controlled rather critically. We have discovered that fundamentally, the named emulsifiers and "soya protein equivalent volumes" must together amount to between about 1.5% and 14% by volume on the inert solids. Moreover, we have discovered that the "soya protein equivalent volume" can vary from about 1% to 13% by volume on the inert solids, that the total emulsifier can vary between about 0.5% and 7.0% by volume on the inert solids, and that the ratio of total "soya protein equivalent volume" to total named emulsifier volume must be at least 1:3 and can be as high as about 13 to 1. We prefer a ratio between 1:1 and about 6:1. When the total soap volume plus "soya protein equivalent volume" (hereinafter referred to as total "soap plus protein") is less than about 5% by volume on the "inert solids" the ratio of "soya protein equivalent volume" to soap volume can be as low as 1:3 up to 9:1; when the total volume of soap plus protein is above 5%, the ratios must be between 1:1 and 13:1. However, most commercial latexes already contain enough soap to require a total of "soap plus protein" in excess of 5%. Moreover, to emulsify and stabilize pigmented compositions, higher total volumes of "soap plus protein" are generally needed. The total volume of "soap plus protein" must generally be kept below about 14% by volume on the "inert solids" in order to secure good hold-out and also to secure good vapor-barrier qualities. Greater total volumes of "soap plus protein" provide so much water-sensitive material in the resulting film that moisture transmission tends to occur at a rate above the FHA requirements, particularly when the film is not pigmented. As pigment is added, the vapor transmission rate tends to be reduced, this tendency being intensified by the use of flake pigments. However, pigmentation can be carried too far in that the volume ratio of film-forming solids to pigment becomes so low as to give weak, non-durable films. For best results in respect to durability, washability, low vapor transmission, and alkali-resistance, we prefer to restrict the pigmentation so that the volume ratio of film-forming solids to pigment is at least about 5 to 4.

The water content of the composition can vary appreciably but for most purposes the water should constitute between about 40% and 60% of the finished composition, on a weight basis. We particularly prefer an amount corresponding to between about 50 and 60% by weight, when determined in the composition at the time it is applied to a desired surface. The asymptotic viscosity characteristic will then be capable of functioning in the manner described hereinabove to impart good "hold-out" or nonpenetrating characteristics. While more water than 60% by weight can be used, the "hold-out" characteristics are not then apt to be developed sufficiently until after the coating has been applied and some of the excess water has been evaporated and/or has been absorbed from the applied film into the surface being coated. When a coating having more than about 60% of water is applied by spraying, some or all of the excess water can be evaporated from the composition while it is passing from the spray gun to the surface being coated. In such case the coating as actually applied to the surface can exhibit good hold-out properties at the instant of contact with the surface being coated.

While we have indicated our preference for emulsion-polymerized latexes, we note one caution; namely, that the latex should contain little and preferably no cationic emulsifier. If cationic material is present, it should amount to only a small percentage on the total weight of emulsifiers in the latex. Otherwise the addition of anionic emulsifiers, such as soaps, would precipitate the cationics, and if other emulsifiers were not already present to preserve the emulsion, such additions would break the latex.

Another caution in respect to commercial emulsion-polymerized latexes is that different kinds and amounts of emulsifiers are apt to be present in latexes obtained from different producers. The prior art indicates that the amount of emulsifier(s) may range from .5% to 5% or even higher by weight on the resin solids. If the volume of emulsifier actually present is within the limits set forth above under the heading "Proportions" and is composed mainly of soaps and/or non-ionic emulsifiers, the latexes with few exceptions can be used in preparing the coating compositions of this invention. If excessive volumes of emulsifier(s) are present, the latexes are very apt to be unsuitable for use in our invention. We have found that anionics such as the alkali metal salts of sulfate esters of fatty alcohols effectively prevent the development of the desired viscosity characteristic if present in more than a few percent of the total volume of "soap plus protein." Other anionics with the exception of soaps have also been found to have similar effects. Accordingly, until the producers of latexes are willing to identify the emulsifiers which are present in their latexes, one who seeks to practice the principles of this invention must resort to formulation tests of the latex in question to determine its suitability, or must resort to appropriate analytical tests. To the best of our knowledge, however, the present status of analytical methods is inadequate to reveal the suitability or unsuitability of a particular latex as readily as do formulation tests which apply the principles set forth herein.

The following examples illustrate the principles of our invention:

*Example 1*

An emulsion coating composition was prepared from the following materials in parts by weight:

| | Parts |
|---|---|
| Soya protein solution | 75 |
| Titanium dioxide pigment | 80 |
| Plate-mica pigment | 180 |
| Pine oil (dispersing agent) | 1 |
| Water | 130 |
| GR–S Latex [1] at 40% N. V. | 420 |
| Ammonium oleate (50% solids) | 4 |

[1] An emulsion of a copolymer of 1,3 butadiene (75%) and styrene (25%) made by a polymerization recipe in parts by weight as follows:

| | |
|---|---|
| Butadiene | 75 |
| Styrene | 25 |
| n-Dodecyl mercaptan | 0.30–0.40 |
| Soap (sodium salts of pure saturated fatty acids, e. g., stearic or palmitic, or pure acids having a single double bond, e. g., oleic elaidic) | 5.0 |
| Potassium persulfate | 0.30 |
| Water | 180 |
| Temperature °C | 50 |

The resulting product was concentrated to 40% solids.

The protein solution was prepared by heating 200 lbs. of commercial, isolated soya protein in 750 lbs. of water to 110° F., then adding 2 lbs. caustic soda and 10 lbs. of monoethanolamine, heating to 160° F. until the protein was well dispersed, then adding 18 lbs. of sodium ortho phenylphenate preservative and 450 lbs. of water. The resulting dispersion was then cooled and stored until used.

The coating composition was prepared by adding the pigments to the protein solution along with the pine oil, ammonium oleate and sufficient water for grinding. The slurry was then ground, after which the balance of the water and the latex were added and blended.

The resulting coating composition had a surface tension of 41 dynes per centimeter and the following proportions of essential ingredients:

| | Weight, Parts | Equivalent Volume | Volume, Percent |
|---|---|---|---|
| Protein solids | 10.5 | 10.5 | 1.48 |
| Soap solids | 10.4 | 10.4 | 1.47 |
| Resin solids | 159.6 | 159.6 | 22.6 |
| Pigment solids: | | | |
| TiO$_2$ | 80.0 | 19.0 | } 11.2 |
| Mica | 180.0 | 60.0 | |
| Water | 446.5 | 446.5 | 63.25 |
| Total | | 706.0 | 100.00 |

The water content amounts to 50.1% by weight of the composition. The composition also had the following viscosities at low shear rates corresponding to the noted speeds, as measured with the No. 1 spindle on a Brookfield viscometer, at 77° F.

| Speed (R. P. M.) | Viscosity, Poises |
|---|---|
| 2 | 10.84 |
| 4 | 7.18 |
| 10 | 4.22 |
| 20 | 2.91 |
| 193 [1] | 2.87 |

[1] Calculated from Stormer viscosity measurements.

Vapor transmission tests were made on the composition by applying the composition to trowelled plaster panels and to plaster board (dry wall) panels, and then testing the coated panels in accordance with the TAPPI method identified supra. The coating was spread uniformly at the rate of about 400 square feet per gallon on the trowelled plaster, and at the rate of about 350 square feet per gallon on the plaster board. The transmission figures for the panels were substantially as follows:

Grams/sq. m./24 hrs.
One coat—not aged_____ 3.43
One coat—aged_____ 2.24

The transmission figures were reduced considerably when a decorative water-resistant coating was applied over each of the barrier coatings. It will be noted that the transmission values for single barrier coats were less than half of the maximum transmission value of 6 grams per square meter allowed by the FHA specifications mentioned hereinabove.

The coating composition was applied to a rough, spongy fiber board of commercial manufacture, and was found to spread at rates up to about 150 square feet per gallon to produce barrier coatings thereon meeting FHA requirements.

When applied under ideal conditions to dense smooth surfaces, vapor barrier films meeting FHA requirements can be obtained when the coating composition is spread at rates of up to about 800 square feet per gallon.

Its spreading rate on smooth fiber boards was found to be about 300 to 350 square feet per gallon.

The composition was found to produce a barrier coating meeting FHA requirements when spread full body on brick, tile, acoustic panels, trowelled cement, wood panels, asbestos-cement panels, paper, box-board, corrugated paper and other materials. It is not our intention to restrict the use of our barrier films to structural materials, since it may be desirable to coat numerous other materials to provide vapor barriers.

The coatings obtained from the composition are dry to the touch within about 20 minutes, and can be coated with other paints, varnishes or emulsion coatings after about 12 hours. The coatings are flexible when dry, and since the GR–S film-forming material can be compounded to be substantially non-oxidizing and since the films formed are not dependent on oxidation for their film-forming characteristics, the coatings remain flexible indefinitely and hence are permanent vapor barriers.

*Example 2*

A clear coating composition was prepared by mixing the following ingredients together:

Parts
Aqueous solution (25% solids) of the neutral soap of monoethanolamine with lauric acid_____ 8
Soya protein solution of Example 1 (14% protein) _____ 86
Pine oil as dispersing agent_____ 1
Butadiene-styrene latex corresponding substantially to Example 1 of the Ryden Patent No. 2,498,712, at 45% solids, and containing about 5% of monovalent soaps by weight on the resin solids__ 435
Monoethanolamine phosphate as anti-rust agent, in aqueous solution (33⅓% solids)_____ 15.5
Cobalt driers_____ .1

The resulting composition had a weight per gallon of 8.6 lbs., and a volume distribution as follows:

| | Weight, parts | Equivalent Volume | Volume, Percent |
|---|---|---|---|
| Soap solids | 11.8 | 11.8 | 2.19 [1] |
| Protein solids | 12.0 | 12.0 | 2.23 |
| Resin solids | 187.2 | 187.2 | 34.80 |
| Water | 326.8 | 326.8 | 60.78 |
| Total | 537.8 | 537.8 | 100.00 |

[1] Total of 12.7% on latex solids.

After being applied at various spreading rates to bond paper, and tested for vapor-barrier qualities, the coating was found to have vapor transmission rates below the FHA limits of 6 grams per square meter per 24 hours, when spread at rates below about 210 square feet per gallon.

*Example 3*

A pigmented coating composition was prepared from the following ingredients in parts by weight:

Parts
Soya protein solution of Example 1_____ 103
Pigment:
   Mica _____ 8
   TiO$_2$ _____ 250
   Lithopone _____ 60
Pine oil_____ 0.5
Butadiene-styrene-vinylidene chloride latex of Example 2 of Ryden Patent No. 2,498,712 at 45% solids, and containing about 5% of monovalent soaps on resin solids_____ 435
Aqueous solution of monoethanolamine soap of lauric acid (25% solids)_____ 16
Water _____ 186
Tributyl phosphate_____ 1

1059.5

The pigment was ground in a paint mill by mixing it with the protein and soap solutions and the water. After the pigment had been dispersed, the latex and remaining ingredients were added. The resulting composition exhibited the desired asymptotic viscosity characteristics, and could be applied to plaster at a spreading rate of about 350 square feet per gallon to yield a vapor-barrier coating passing FHA requirements. The composition contained the following proportions of essential ingredients:

| | Weight, parts | Equivalent Volume | Volume, Percent |
|---|---|---|---|
| Protein | 14.4 | 14.4 | 1.76 |
| Soap | 13.8 | 13.8 | 1.69 |
| Solids: | | | |
|   Latex | 186.2 | 186.2 | 22.79 |
|   Mica | 8.0 | 2.7 | .33 |
|   TiO$_2$ | 250. | 60.5 | 7.40 |
|   Lithopone | 60. | 14.0 | 1.71 |
| Water | 523.4 | 523.4 | 64.32 |
| Total | | | 100.00 |

Water content is about 49.3% by weight on whole composition.

*Example 4*

A vapor barrier emulsion coating composition was prepared from the following ingredients, indicated in parts by weight.

Parts
Water_____ 29
Soya protein solution of Example 1_____ 25
Neutral lauric acid soap of Example 2_____ 2

The above ingredients were mixed together thoroughly and then 4 parts of zinc stearate was added and mixed, followed by 4 parts of Neozone D¹ antioxidant. Then the following ingredients were added in the order named:

| | Parts |
|---|---|
| Water | 57 |
| Soya protein solution of Example 1 | 55 |
| Lauric acid soap of Example 2 | 6 |
| Pine oil (antifoam) | 1 |
| Zinc oxide pigment | 15 |
| Fine mica | 100 |
| Commercial neoprene² latex at 50% solids | 400 |

¹ A commercial product of the Du Pont Company.
² Emulsion-polymerized chloro-2-butadiene-1,3 as a stable dispersion containing stabilizers, dispersing agents and about 4% alkali soap(s) by weight on the resin solids. The resin particle size was reported to be about .15 micron.

The resulting mass was mixed thoroughly by stirring, and finally was thinned to desired consistency with 89 parts of water.

The resulting coating composition contained 56.8% water, by weight, and was found to exhibit good "hold-out" and to give single coats meeting FHA requirements as to vapor transmission.

The composition contained 192 volumes of resin solids, 36.0 volumes of pigment, 11.2 volumes of protein and a total of 9.8 volumes of monovalent soap. The total "protein plus soap" amounted to 9.3% by volume on the 228 volumes of "inert solids," and a protein/soap ratio of 1.14 to 1 was calculated.

*Example 5*

A pigmented vapor barrier composition was prepared by replacing the neoprene latex of Example 4 with 400 parts of an acrylonitrile-isobutylene copolymer latex at 50% solids, and which contained 4% by weight on the resin solids of alkali soap(s). The latex corresponded to the teachings of the Davison U. S. Patent No. 2,575,750.

The resulting coating composition was found to exhibit good "hold-out" and to provide single coats passing the FHA vapor transmission requirements.

*Example 6*

A clear coating composition was prepared to be identical with Example 2, except for the use of casein instead of soya protein. 86 parts of a 10% casein solution was substituted in the formulation of Example 2 in place of the 86 parts of 14% soya protein solution. The casein solution was prepared by heating 20 lbs. of casein at 170° F. for 3 hours in 174 lbs. of water containing 2.2 lbs. of 26° Bé. commercial ammonium hydroxide, cooling and adding 2 lbs. phenol and 2 lbs. of boric acid.

The coating composition so prepared was very similar in its hold-out, vapor-transmission and other properties to those of the composition of Example 2. It should be noted that when a factor of 1.4 is employed with this example, the "soya protein equivalent volume" of the casein is same as the protein volume in Example 2.

In the following claims, where vapor transmission rates are expressed in grams per square meter per 24 hours, they are abbreviated for convenience but are intended to identify the transmission rates which are determined by the TAPPI method or equivalent ASTM method, as expressed in grams per square meter per 24 hours at 50% vs 5% relative humidity at 73° F.

This application is a continuation-in-part of our co-pending application Serial No. 99,572, filed June 16, 1949, now abandoned, and entitled Emulsion Vapor Barrier Coating Composition.

Having described our invention, what we claim is:

1. An emulsion coating composition characterized by good hold-out properties and the ability to form a substantially continuous film when applied in a single coat on porous surfaces, said composition when applied being an emulsion of the oil-in-water type and containing between 40% and 60% of water by weight, the remainder consisting essentially of: (*a*) finely-divided inert solids having a particle size below about 44 microns, comprising at least one elastomeric and polymeric synthetic water-insoluble film-forming material having a particle size below about 0.5 micron and selected from the group consisting of: elastomeric homopolymers of vinyl compounds, elastomeric homopolymers of isobutylene, and copolymers of a mixture of monomers containing at least one vinyl compound, said elastomeric film-forming material having a volume ratio to any remaining inert solids in the composition of at least 1 to 1; (*b*) an emulsifier component comprising monovalent, substantially-neutral soap of fatty acids having 12 to 20 carbon atoms as the principal emulsifier and as the sole ionic emulsifier in said composition, said soap being selected from the group consisting of alkali metal soaps, ammonium soaps, organic amine soaps and mixtures thereof; and (*c*) at least one dispersed alkali-soluble, acid precipitable protein; said inert solids, said emulsifier component and said protein forming a substantially homogeneously dispersed phase in a continuous aqueous phase, and said emulsifier component and protein being proportioned as follows:

| | Percent by volume on inert solids |
|---|---|
| A. Emulsifier(s) | 0.5–7 |
| B. "Soya protein equivalent volume" of the protein | 1.0–13 |
| C. Total of A plus B | 1.5–14 |
| D. Ratio of B to A: (1) between 1:3 and 9:1 when the total of A plus B is less than 5% by volume on the inert solids; (2) between 1:1 and 13:1 when the total of A plus B is from 5% to 14% by volume on the inert solids. | |

2. A coating composition as claimed in claim 1 wherein the ratio of B to A is between about 1:1 and 6:1.

3. A coating composition as claimed in claim 2 wherein the emulsifier component consists predominantly of fatty acid soap, and wherein the protein is isolated soya protein.

4. A coating composition as claimed in claim 3 wherein the inert solids include pigment, wherein the volume ratio of film-forming material to remaining inert solids is at least 5 to 4, and wherein the water content is between 50% and 60% by weight.

5. A composition as claimed in claim 1 wherein the inert solids consist of film-forming material and pigment, and wherein the volume ratio of film-forming material to total pigment is at least 5 to 4.

6. A composition as claimed in claim 5 wherein the film-forming material consists of emulsion-polymerized copolymer of styrene and butadiene-1,3.

7. A composition as claimed in claim 1 wherein the film-forming material consists of emulsion-polymerized copolymer of styrene and butadiene-1,3.

8. A composition as claimed in claim 7 wherein the copolymer is composed of between about 75% and 57% styrene and about 25–43% of butadiene-1,3.

9. A composition as claimed in claim 1 wherein the water content is between 50% and 60% by weight.

10. A composition as claimed in claim 9 wherein the ratio of B to A is between 1:1 and 6:1.

11. A composition as claimed in claim 10 wherein the inert solids consist of film-forming material and pigment including flake pigment and wherein the volume ratio of film-forming material to total pigment is at least 5 to 4.

12. A composition as claimed in claim 11 wherein the said flake pigment constitutes a major part of the total pigment, and wherein said composition is additionally characterized by its ability to deposit in a single dried coat a substantially continuous pigmented coating having a vapor transmission rate less than about 6 grams per square meter per 24 hours.

13. A coating composition as claimed in claim 12 wherein said film-forming material consists of emulsion-polymerized copolymer of styrene and butadiene-1,3.

14. A composition as claimed in claim 13 wherein said copolymer is composed of between 75% and 57% styrene and 25% and 43% of butadiene-1,3.

References Cited in the file of this patent

UNITED STATES PATENTS

| | | |
|---|---|---|
| 2,296,427 | Daniel et al. | Sept. 22, 1942 |
| 2,401,666 | Schmidt | June 4, 1946 |
| 2,512,697 | Te Grotenhuis | June 27, 1950 |
| 2,587,657 | Schulte et al. | Mar. 4, 1952 |
| 2,605,242 | Betts et al. | July 29, 1952 |

FOREIGN PATENTS

| | | |
|---|---|---|
| 576,665 | Great Britain | Apr. 15, 1946 |